United States Patent
Park et al.

(10) Patent No.: US 9,107,212 B2
(45) Date of Patent: Aug. 11, 2015

(54) TERMINAL DEVICE FOR RECEIVING SIGNAL IN WIRELESS COMMUNICATION SYSTEM FOR SUPPORTING A PLURALITY OF COMPONENT CARRIERS AND METHOD THEREOF

(71) Applicant: LG Electronics Inc., Seoul (KR)

(72) Inventors: Kyu Jin Park, Anyang-si (KR); Sung Ho Moon, Anyang-si (KR); Jae Hoon Chung, Anyang-si (KR); Seung Hee Han, Anyang-si (KR); Yeong Hyeon Kwon, Anyang-si (KR); Han Gyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/546,259

(22) Filed: Nov. 18, 2014

(65) Prior Publication Data

US 2015/0139126 A1 May 21, 2015

Related U.S. Application Data

(63) Continuation of application No. 13/511,346, filed as application No. PCT/KR2010/008509 on Nov. 30, 2010, now Pat. No. 8,902,802.

(60) Provisional application No. 61/265,333, filed on Nov. 30, 2009.

(30) Foreign Application Priority Data

Nov. 30, 2010 (KR) ........................ 10-2010-0120210

(51) Int. Cl.
G08C 17/00 (2006.01)
H04W 72/04 (2009.01)

(52) U.S. Cl.
CPC .................................. *H04W 72/042* (2013.01)

(58) Field of Classification Search
CPC . H04W 52/0235; H04W 72/00; H04W 88/04; H04W 88/02
USPC ................................ 370/311; 340/7.32–7.38; 455/343.1–343.6
See application file for complete search history.

(56) References Cited

U.S. PATENT DOCUMENTS

2010/0232373 A1 9/2010 Nory et al.
2010/0254329 A1* 10/2010 Pan et al. ...................... 370/329

(Continued)

FOREIGN PATENT DOCUMENTS

CN 101584191 A 11/2009
KR 10-2009-0086441 8/2009

OTHER PUBLICATIONS

Motorola, "Comparison of PDCCH Structures for Carrier Aggregation", 3GPP TSG RAN 1 #56, Mar. 23-27, 2009, R1-091326.

(Continued)

*Primary Examiner* — Mang Yeung
(74) *Attorney, Agent, or Firm* — McKenna Long & Aldridge LLP

(57) ABSTRACT

Disclosed are a terminal device for receiving a signal in a wireless communication system for supporting a plurality of component carriers and a method thereof. In the terminal device for receiving the signal in the system for supporting the component carriers, a receiver receives a Physical Downlink Control Channel (PDCCH) including control information of a first type component carrier from a base station or a relay. A processor performs a decoding operation or controls an operation in a slip mode on the basis of control information included in a PDCCH in a second type component carrier after a time corresponding to a particular time offset value passes from a transmission time point of the PDCCH.

14 Claims, 8 Drawing Sheets

(56) References Cited

U.S. PATENT DOCUMENTS

| | | |
|---|---|---|
| 2010/0279628 A1 | 11/2010 | Love et al. |
| 2011/0044239 A1* | 2/2011 | Cai et al. ............... 370/328 |
| 2011/0090983 A1* | 4/2011 | Zhang et al. ............ 375/295 |
| 2011/0188587 A1 | 8/2011 | Zhang et al. |
| 2012/0218952 A1* | 8/2012 | Kwon et al. ............. 370/329 |

OTHER PUBLICATIONS

Jo et al., "Wider bandwidth technologies in LTE-Advanced", Telecommunication Review, vol. 19, No. 4, pp. 581-594, SK Telecom, Aug. 2009.

* cited by examiner (a)

(b)

TERMINAL DEVICE FOR RECEIVING SIGNAL IN WIRELESS COMMUNICATION SYSTEM FOR SUPPORTING A PLURALITY OF COMPONENT CARRIERS AND METHOD THEREOF

This application is a Continuation of application Ser. No. 13/511,346 filed May 22, 2012, which is a 35 U.S.C. §371 National Stage entry of International Application of PCT/KR2010/008509 filed on Nov. 30, 2010, which claims the benefit under of U.S. Provisional Application No. 61/265,333, filed on Nov. 30, 2009; and claims the benefit of Korean Patent Application No. 10-2010-0120210, filed on Nov. 30, 2010, all of which are incorporated by reference in their entirety herein.

TECHNICAL FIELD

The present invention relates to wireless communication, and more particularly, to a method of receiving a signal in a wireless communication system supporting a plurality of component carriers and a user equipment (UE) using the same.

BACKGROUND ART

As an example of a mobile communication system to which the present invention is applicable, a $3^{rd}$ Generation Partnership Project (3GPP) Long Term Evolution (LTE) or LTE-advanced (hereinafter, LTE-A) communication system will be schematically described.

One or more cells may exist per eNB. The cell is set to use a bandwidth such as 1.25 MHz, 2.5 MHz, 5 MHz, 10 MHz, 15 MHz or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQuest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs.

Although radio communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

Recently, the standardization of the subsequent technology of the LTE is ongoing in the 3GPP. In the present specification, the above-described technology is called "LTE-Advanced" or "LTE-A". The LTE system and the LTE-A system are different from each other in terms of system bandwidth and introduction of a relay node.

The LTE-A system aims to support a wideband of a maximum of 100 MHz. The LTE-A system uses carrier aggregation or bandwidth aggregation technology which achieves the wideband using a plurality of frequency blocks. Carrier aggregation enables a plurality of frequency blocks to be used as one large logical frequency band in order to use a wider frequency band. The bandwidth of each of the frequency blocks may be defined based on the bandwidth of a system block used in the LTE system. Each frequency block is transmitted using a component carrier.

As carrier aggregation technology is employed in an LTE-A system which is a next-generation communication system, there is a need for a method of, at a UE, receiving a signal from an eNB or a relay node in a system supporting a plurality of carriers.

DISCLOSURE

Technical Problem

An object of the present invention is to provide a method of receiving a signal at a user equipment (UE) in a system supporting a plurality of component carriers.

Another object of the present invention is to provide a UE for receiving a signal in a system supporting a plurality of component carriers.

The technical problems solved by the present invention are not limited to the above technical problems and those skilled in the art may understand other technical problems from the following description.

Technical Solution

The object of the present invention can be achieved by providing a method of receiving a signal at a user equipment (UE) in a wireless communication system supporting a plurality of component carriers, the method including receiving a physical downlink control channel (PDCCH) including control information of a first type component carrier from a base station (BS) or a relay node (RN), and performing decoding based on the control information included in the PDCCH at a second type component carrier after a time corresponding to a specific time offset value has passed from a time when the PDCCH is transmitted, or operating in a sleep mode.

The method may further include receiving information about the specific time offset value from the BS or the RN.

The specific time offset value may be determined based on the size of the PDCCH, and the specific time offset value may correspond to a time required to decode the PDCCH. The specific time offset value may be set in symbol units.

The specific time offset value is computed by Equation A:

$$T_{offset}=T_{symbol}\times \text{ceil}(T_{decode\_Nmax}/T_{symbol}) \qquad \text{Equation A}$$

(where, $T_{symbol}$ denotes a time corresponding to one symbol duration, $T_{decode\_Nmax}$ denotes a time required to decode a maximum size of the PDCCH, and a ceil function denotes a function for outputting a minimum value among integers greater than or equal to a specific number.

The first type component carrier may be accessible by a first type UE using a first wireless communication scheme and a second type UE using a second wireless communication scheme, and the second type component carrier may be a carrier on which control information for the UE is not transmitted.

In another aspect of the present invention, there is provided a user equipment (UE) for receiving a signal in a wireless communication system supporting a plurality of component carriers, including a receiver configured to receive a physical downlink control channel (PDCCH) including control information of a first type component carrier from a base station (BS) or a relay node (RN), and a processor configured to perform decoding based on the control information included in the PDCCH at a second type component carrier after a time corresponding to a specific time offset value has passed from a time when the PDCCH is transmitted, or operate in a sleep mode.

The receiver of the UE may further receive information about the specific time offset value from the base station or the relay.

Advantageous Effects

A user equipment (UE) in a system supporting a plurality of component carriers according to the present invention can reduce unnecessary decoding so as to improve communication performance.

The user equipment (UE) according to the present invention appropriately operates in a sleep mode if data is not transmitted according to control information, thereby saving power.

According to various embodiments of the present invention, an eNB and a relay node are aware of an uplink backhaul subframe structure through signaling, thereby efficiently communicating.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details. For example, although, in the following description, it is assumed that the mobile communication system is a $3^{rd}$ Generation Partnership Project (3GPP) Long Term Evolution (LTE) system, the present invention is applicable to other mobile communication systems excluding the unique matters of the 3GPP LTE system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user end device such as a user equipment (UE), a mobile station (MS) or an advanced mobile station (AMS), and a base station includes a node of a network end communicating with a terminal, such as a Node-B, an eNode B, a base station or an access point (AP). A repeater may be called a relay node (RN), a relay station (RS), a relay, etc.

In a mobile communication system, a UE and a relay node may receive information from an eNB in downlink and a UE and a relay node may transmit information to an eNB in uplink. Information transmitted or received by a UE or a relay node includes data and a variety of control information and various physical channels exist according to the kinds and usage of information transmitted or received by the UE or the relay node.

Figure 1:
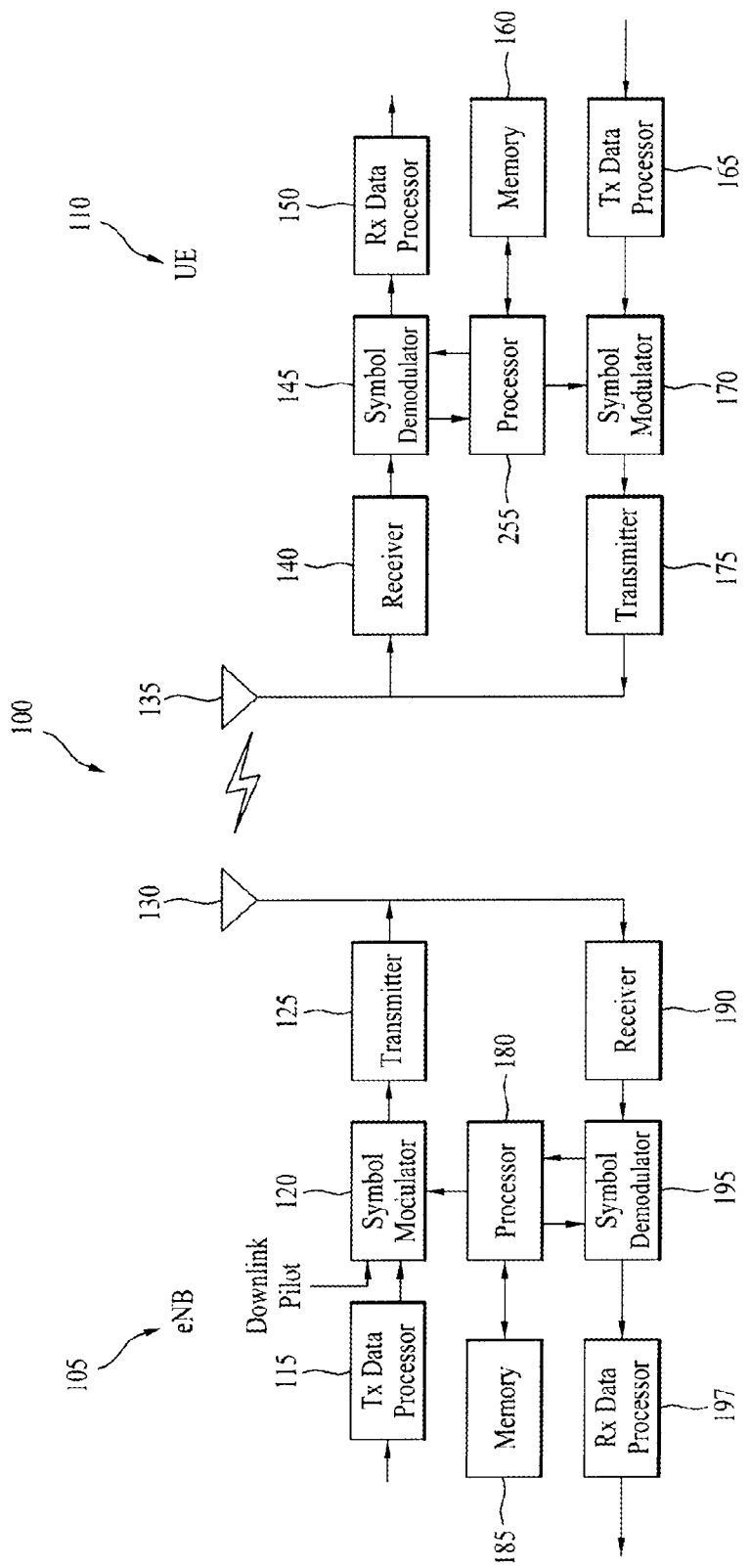
FIG. 1 is a block diagram showing the configuration of an eNB 105 and a user equipment (UE) 110 in a wireless communication system 100.

FIG. 1 is a block diagram showing the configuration of an eNB 105 and a UE 110 in a communication system 100 according to the present invention.

Although one eNB 105 and one UE 110 are shown in order to simplify the wireless communication system 100, the wireless communication system 200 may include one or more eNBs and/or one or more UEs.

Referring to FIG. 1, the eNB 105 may include a transmission (Tx) data processor 115, a symbol modulator 120, a transmitter 125, a Tx/Rx antenna 130, a processor 180, a memory 185, a receiver 190, a symbol demodulator 195 and a reception (Rx) data processor 297. The UE 110 may include a Tx data processor 165, a symbol modulator 170, a transmitter 175, a Tx/Rx antenna 135, a processor 155, a memory 160, a receiver 140, a symbol demodulator 155 and an Rx data processor 150. Although one antenna 130 and one antenna 135 are respectively shown as being included in the eNB 105 and the UE 110, each of the eNB 105 and the UE 110 may include a plurality of antennas. Accordingly, the eNB 105 and the UE 110 according to the present invention support a multiple input multiple output (MIMO) system. The eNB 105 according to the present invention may support both a single user (SU)-MIMO scheme and a multi user (MU)-MIMO scheme.

In downlink, the Tx data processor 115 receives traffic data, formats and codes the received traffic data, interleaves and modulates (or symbol-maps) the coded traffic data, and provides modulated symbols ("data symbols"). The symbol modulator 120 receives and processes the data symbols and pilot symbols and provides a stream of the symbols.

The symbol modulator 120 multiplexes data and pilot symbols and transmits the multiplexed data and pilot symbols to the transmitter 125. At this time, each transmitted symbol may include a data symbol, a pilot symbol, or a null signal value. The pilot symbols may be contiguously transmitted in symbol periods. The pilot symbols may include frequency division multiplexing (FDM) symbols, orthogonal frequency division multiplexing (OFDM) symbols, time division multiplexing (TDM) symbols or code division multiplexing (CDM) symbols.

The transmitter 125 receives the stream of the symbols, converts the stream into one or more analog signals, and additionally adjusts (e.g., amplifies, filters and frequency up-converts) the analog signals, thereby generating a downlink signal suitable for transmission through a radio channel. Subsequently, the downlink signal is transmitted to a UE through the antenna 130.

In the UE 110, the antenna 135 receives a downlink signal from the eNB and provides the received signal to the receiver 140. The receiver 140 adjusts (for example, filters, amplifies, and frequency down-converts) the received signal, digitalizes the adjusted signal, and acquires samples. The symbol demodulator 145 demodulates the received pilot symbols and provides the demodulated pilot signals to the processor 155, for channel estimation.

The symbol demodulator 145 receives a frequency response estimation value for downlink from the processor 155, performs data demodulation with respect to the received data symbols, acquires data symbol estimation values (which are estimation values of the transmitted data symbols), and provides the data symbol estimation values to the Rx data processor 150. The Rx data processor 150 demodulates (that is, symbol-demaps), deinterleaves and decodes the data symbol estimation values and restores the transmitted traffic data.

The processes by the symbol demodulator 145 and the Rx data processor 150 are complementary to the processes by the symbol modulator 120 and the Tx data processor 115 of the eNB 105.

In the UE 110, the Tx data processor 165 processes traffic data and provides data symbols in uplink. The symbol modulator 170 receives the data symbols, multiplexes the data symbols with pilot symbols, performs modulation, and provides a stream of symbols to the transmitter 175. The transmitter 175 receives and processes the stream of symbols, generates an uplink signal, and transmits the uplink signal to the eNB 105 through the antenna 135.

In the eNB 105, the uplink signal is received from the UE 110 through the antenna 130. The receiver 190 processes the received uplink signal and acquires samples. Subsequently, the symbol demodulator 195 processes the samples and provides pilot symbols and data symbol estimation values received in uplink. The Rx data processor 297 processes the data symbol estimation values and restores the traffic data transmitted from the UE 110.

The respective processors 155 and 180 of the UE 110 and the eNB 105 instruct (for example, control, adjust, or manage) the operations of the UE 110 and the eNB 105, respectively. The processors 155 and 180 may be connected to the memories 160 and 185 for storing program codes and data, respectively. The memories 160 and 185 are respectively connected to the processor 180 so as to store operating systems, applications and general files.

The processors 155 and 180 may be called controllers, microcontrollers, microprocessors, microcomputers, etc. The processors 155 and 180 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 155 and 180.

If the embodiments of the present invention are implemented by firmware or software, the firmware or software may be configured to include modules, procedures, functions, etc. for performing the functions or operations of the present invention. The firmware or software configured to perform the present invention may be included in the processors 155 and 180 or may be stored in the memories 160 and 185 so as to be executed by the processors 155 and 180.

Layers of the radio interface protocol between the eNB and the UE in the wireless communication system (network) may be classified into a first layer (L1), a second layer (L2) and a third layer (L3) based on the three low-level layers of the well-known Open System Interconnection (OSI) model of a communication system. A physical layer belongs to the first layer and provides an information transport service through a physical channel. A Radio Resource Control (RRC) layer belongs to the third layer and provides control radio resources between the UE and the network. The UE and the eNB exchange RRC messages with each other through a wireless communication network and the RRC layer.

Figure 2:
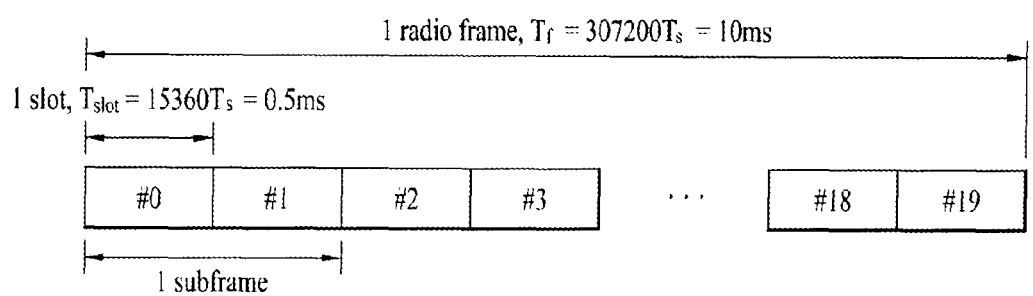
FIG. 2 is a diagram showing the structure of a radio frame used in a 3GPP LTE system which is an example of a mobile communication system.

FIG. 2 is a diagram showing the structure of a radio frame used in a 3GPP LTE system which is an example of a mobile communication system.

Referring to FIG. 2, one radio frame has a length of 10 ms ($327200 \cdot T_s$) and includes 10 subframes with the same size. Each subframe has a length of 1 ms and includes two slots. Each slot has a length of 0.5 ms ($15360 \cdot T_s$). $T_s$ denotes a sampling time, and is represented by $T_s=1/(15 \text{ kHz} \times 2048)= 3.2552 \times 10^{-8}$ (about 33 ns). Each slot includes a plurality of OFDM or SC-FDMA symbols in a time domain, and includes a plurality of resource blocks (RBs) in a frequency domain.

In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 3:
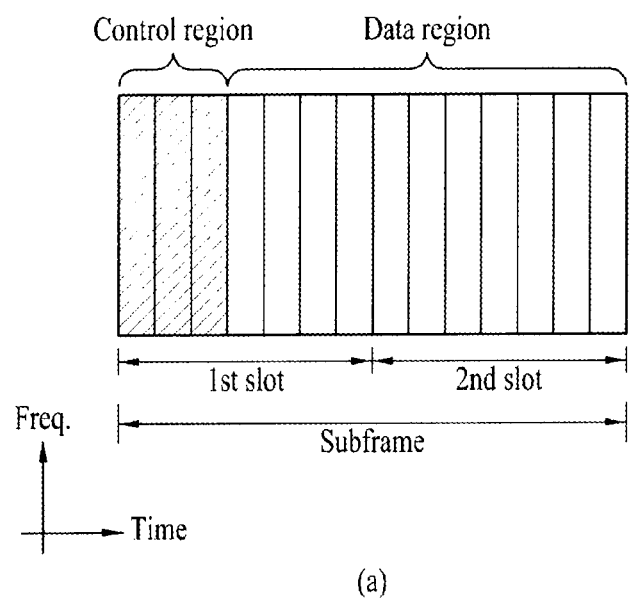
FIGS. 3a and b are diagrams showing the structure of a downlink and uplink subframe in a 3GPP LTE system which is an example of a mobile communication system.
Figure 3:
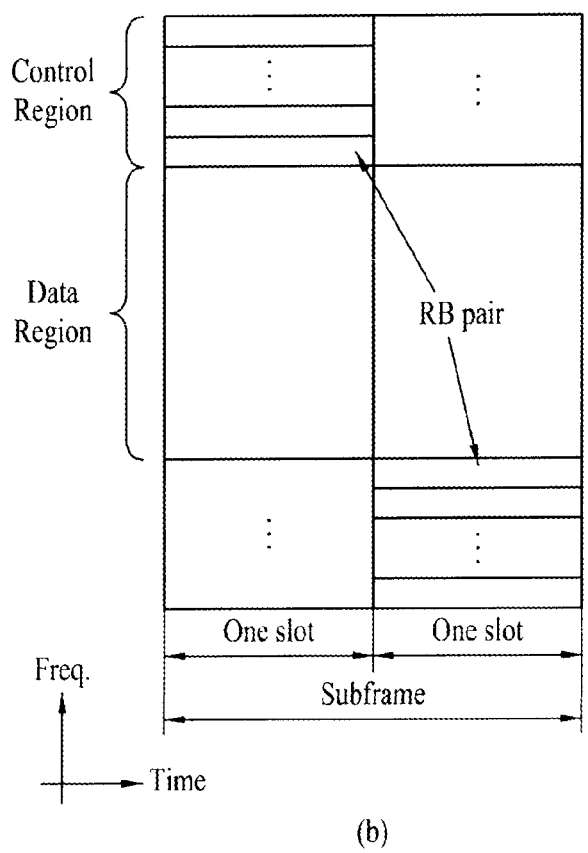

FIG. 3 is a diagram showing the structure of a downlink and uplink subframe in a 3GPP LTE system which is an example of a mobile communication system.

Referring to FIG. 3(a), one downlink subframe includes two slots in a time domain. A maximum of three OFDM symbols located in a front portion of a first slot within the downlink subframe corresponds to a control region to which control channels are assigned, and the remaining OFDM symbols correspond to a data region to which a physical downlink shared channel (PDSCH) is allocated.

Examples of downlink control channels used in the 3GPP LTE system include a physical control format indicator channel (PCFICH), a physical downlink control channel (PD- CCH), a physical hybrid ARQ indicator channel (PHICH), etc. The PCFICH is transmitted at a first OFDM symbol of a subframe and carries information regarding the number of OFDM symbols (that is, the size of the control region) used for transmission of control channels within the subframe. Control information transmitted through the PDCCH is referred to as downlink control information (DCI). DCI indicates uplink resource assignment information, downlink resource assignment information, an uplink transmit (Tx) power control command for arbitrary UE groups, etc. The PHICH carries an acknowledgement (ACK)/not-acknowledgement (NACK) signal for uplink hybrid automatic repeat request (HARQ). That is, an ACK/NACK signal for uplink data transmitted by a UE is transmitted on a PHICH.

A PDCCH which is a downlink physical channel will now be described.

An eNB may transmit a transport format and a resource allocation of a physical downlink shared channel (PDSCH) (which is called DL grant), resource allocation information of a PUSCH (which is called UL grant), a set of Tx power control commands for individual UEs within an arbitrary UE group, a Tx power control command, activation of a voice over IP (VoIP) service, etc. through a PDCCH. A plurality of PDCCHs may be transmitted in a control region. A UE may monitor a plurality of PDCCHs. The PDCCH is composed of an aggregation of one or several consecutive control channel elements (CCEs). A PDCCH composed of one or several CCEs may be transmitted in a control region after being subjected to subblock interleaving. The CC is a logical allocation unit used to provide a PDCCH with a coding rate based on a radio channel state. The CCE corresponds to a plurality of resource element groups. A format of the PDCCH and the number of bits of the available PDCCH are determined according to a correlation between the number of CCEs and the coding rate provided by the CCEs.

Control information transmitted through a PDCCH is referred to as downlink control information (DCI). Table 1 shows DCI according to a DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates uplink resource allocation information, DCI formats 1 to 2 indicate downlink resource allocation information, and DCI formats 3 and 3A indicate uplink transmit power control (TPC) commands for arbitrary UE groups.

A method of mapping resources for PDCCH transmission at an eNB in an LTE system will be briefly described.

In general, an eNB may transmit scheduling allocation information and other control information through a PDCCH. A physical control channel may be transmitted on an aggregation of one or a plurality of CCEs. One CCE includes nine resource element groups (REGs). The number of REGs which are not allocated to a physical control format indicator channel (PCFICH) or a physical automatic repeat request indicator channel (PHICH) is $N_{REG}$. CCEs which can be used in a system are 0 to $N_{CCE}-1$ (here, $N_{CCE}=\lfloor N_{REG}/9 \rfloor$). The PDCCH supports multiple formats as shown in Table 2. One PDCCH composed of n consecutive CCEs starts from a CCE for performing i mode n=0 (here, i denotes a CCE number). Multiple PDCCHs may be transmitted via one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, the eNB may determine a PDCCH format depending on to how many regions control information is transmitted. In addition, the UE reads control information, etc. in CCE units, thereby reducing overhead. Similarly, a relay node may read control information, etc. in CCE units. In an LTE-A system, resource elements (REs) may be mapped in units of relay-control channel elements (R-CCEs), in order to transmit an R-PDCCH to an arbitrary relay.

Referring to FIG. 3(b), an uplink subframe may be divided into a control region and a data region in a frequency domain. The control region is allocated to a Physical Uplink Control Channel (PUCCH) carrying uplink control information. The data region is allocated to a Physical uplink Shared Channel (PUSCH) carrying user data. In order to maintain single carrier characteristics, one UE does not simultaneously transmit the PUCCH and the PUSCH. The PUCCH for one UE is allocated to an RB pair in one subframe. RBs belonging to the RB pair occupy different subcarriers with respect to two slots. Thus, the RB pair allocated to the PUCCH is "frequency-hopped" at a slot boundary.

Figure 4:
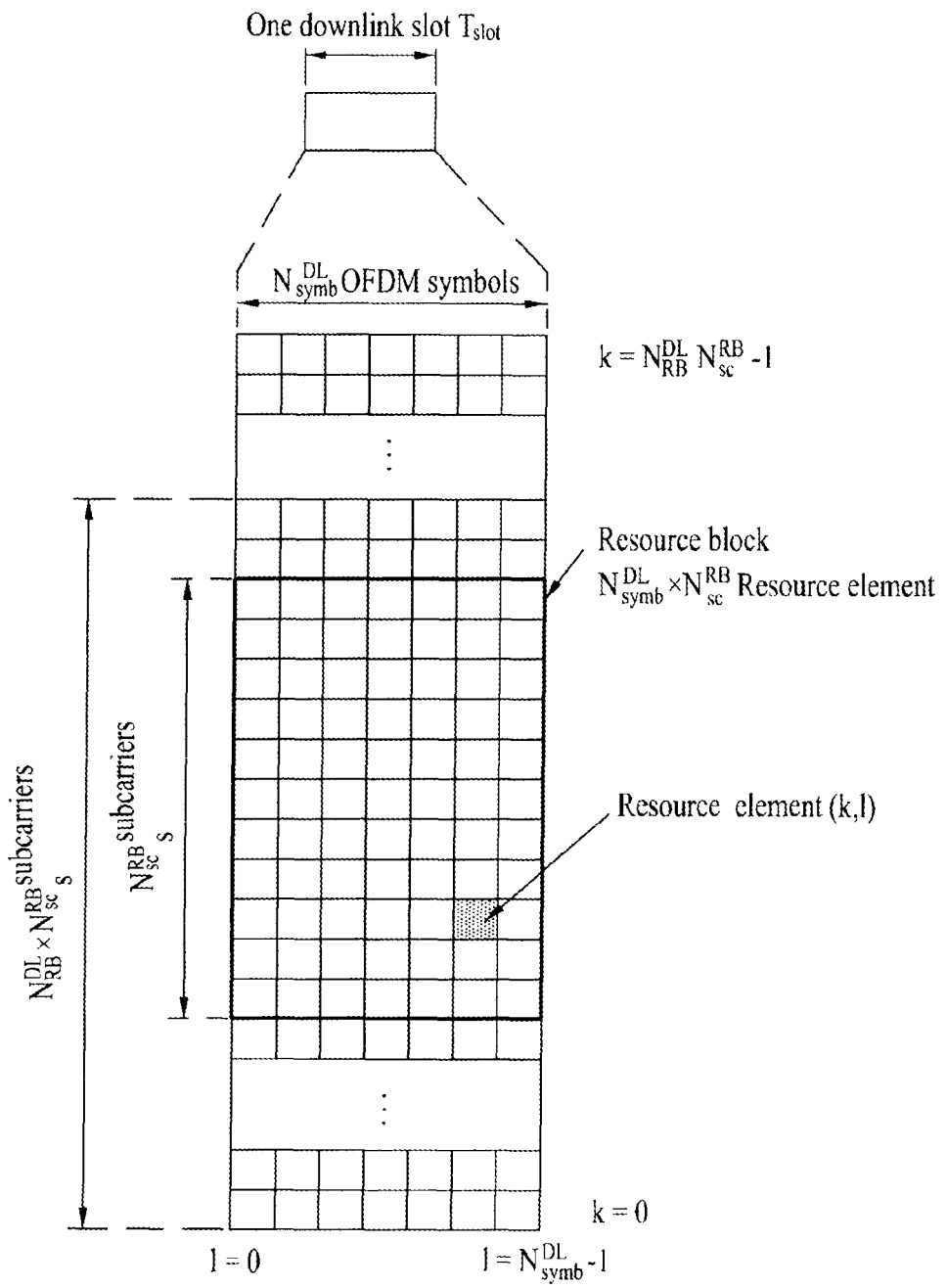
FIG. 4 is a diagram showing a time-frequency resource grid structure of downlink used in the present invention.

FIG. 4 is a diagram showing a time-frequency resource grid structure of downlink used in the present invention.

A downlink signal transmitted at each slot may be used as a resource grid structure including $N_{RB}^{DL} \times N_{SC}^{RB}$ subcarriers and $N_{symb}^{DL}$ orthogonal frequency division multiplexing (OFDM) symbols. Here, $N_{RB}^{DL}$ denotes the number of Resource blocks (RBs) in downlink, $N_{SC}^{DL}$ denotes the number of subcarriers configuring one RB, and $N_{symb}^{DL}$ denotes the number of OFDM symbols in one downlink slot. $N_{RB}^{DL}$ is changed according to a downlink transmission bandwidth configured within a cell and should satisfy $N_{RB}^{min,DL} \leq N_{RB}^{DL} \leq N_{RB}^{max,DL}$. Here, $N_{RB}^{min,DL}$ denotes a minimum downlink bandwidth supported by a wireless communication system and $N_{RB}^{max,RB}$ denotes a maximum downlink bandwidth supported by a wireless communication system. Although $N_{RB}^{min,DL}=6$ and $N_{RB}^{max,RB}=110$, the present invention is not limited thereto. The number of OFDM symbols included in one slot may be changed according to a cyclic prefix (CP) length and a subcarrier interval. In case of multi-antenna transmission, one resource grid may be defined per antenna port.

Each element in the resource grid for each antenna port is referred to as a resource element (RE) and is uniquely identified by an index pair (k, l) in a slot. Here, k denotes an index of a frequency domain, l denotes an index of a time domain, k has any one value of 0, ..., and $N_{RB}^{DL}N_{SC}^{RB-1}$ and l has any one value of 0, ..., and $N_{symb}^{DL-1}$.

Resource blocks (RBs) shown in FIG. 4 are used to describe a mapping relationship between physical channels and REs. The RB may be divided into a physical resource block (PRB) and a virtual resource block (VRB). One PRB is defined by $N_{symb}^{DL}$ consecutive OFDM symbols of the time domain and $N_{SC}^{RB}$ consecutive subcarriers of the frequency domain. Here, $N_{symb}^{DL}$ and $N_{SC}^{RB}$ may be predetermined values. For example, $N_{symb}^{DL}$ and $N_{SC}^{RB}$ may be given as shown in Table 3. Accordingly, one PRB includes $N_{symb}^{DL} \times N_{SC}^{RB}$ REs. One PRB corresponds to one slot in the time domain and corresponds to 180 kHz in the frequency domain, but the present invention is not limited thereto.

TABLE 3

| Configuration | | $N_{sc}^{RB}$ | $N_{symb}^{DL}$ |
|---|---|---|---|
| Normal cyclic prefix | $\Delta f = 15$ kHz | 12 | 7 |
| Extended cyclic prefix | $\Delta f = 15$ kHz | | 6 |
| | $\Delta f = 7.5$ kHz | 24 | 3 |

The PRB has a value ranging from 0 to $N_{RB}^{DL-1}$ in the frequency domain. A relationship between a PRB number $n_{PRB}$ in the frequency domain and an RE (k, l) within one slot satisfies $$n_{PRB} = \left\lfloor \frac{k}{N_{sc}^{RB}} \right\rfloor.$$

The size of the VRB is equal to that of the PRB. The VRB may be divided into a localized VRB (LVRB) and a distributed VRB (DVRB). With the respective types of VRBs, a pair of VRBs located in two slots of one subframe is allocated a single VRB number $n_{VRB}$.

The VRB may have the same size as the PRB. Two types of VRBs are defined: a first type is a localized VRB (LVRB) and a second type is a distributed VRB (DVRB). With respect to the respective types of VRBs, a pair of VRBs is allocated over two slots of one subframe with a single VRB index (which, hereinafter, may be referred to as a VRB number). In other words, $N_{RB}^{DL}$ VRBs belonging to a first slot between two slots configuring one subframe are allocated any one of indexes from 0 to $N_{RB}^{DL-1}$ and $N_{RB}^{DL}$ VRBs belonging to a second slot between the two slots are similarly allocated any one of indexes from 0 to $N_{RB}^{DL-1}$.

The radio frame structure, the downlink subframe and uplink subframe, the time-frequency resource grid structure of downlink, etc. described with reference FIGS. 2 to 4 are applicable between an eNB and a relay node.

Hereinafter, a process of transmitting a PDCCH from an eNB to a UE in an LTE system will be described. The eNB determines a PDCCH format according to DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a unique identifier of the UE may be masked to the CRC. If the R-PDCCH is for a specific relay node, a unique identifier of the relay node, e.g., a cell-RNTI (C-RNTI) may be masked to the CRC. Alternatively, if the PDCCH is for a paging message, a paging indicator identifier (P-RNTI) may be masked to the CRC. If the PDCCH or the R-PDCCH is for system information, a system information identifier and a system information RNTI (SI-RNTI) may be masked to the CRC. To indicate a random access response that is a response for transmission of a random access preamble of the UE or the relay node, a random access-RNTI (RA-RNTI) may be masked to the CRC. Table 4 shows an example of identifiers masked to the PDCCH and/or the R-PDCCH.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If a C-RNTI is used, the PDCCH or the R-PDCCH carries control information for a specific UE or a specific relay node corresponding thereto and, if another RNTI is used, the PDCCH or the R-PDCCH carries common control information received by all or a plurality of UEs or relay nodes in the cell. The eNB performs channel coding with respect to DCI, to which CRC is attached, and generates coded data. The eNB performs rate matching according to the number of CCEs allocated to the PDCCH or R-PDCCH format. Thereafter, the eNB modulates the coded data and generates modulated symbols. The eNB maps the modulated symbols to physical REs.

While the existing 3GPP LTE Release 8 (including Release 9) system is based on transmission and reception on a single carrier band based on a scalable band size, the LTE-advanced system may support downlink transmission using frequency-domain resources (that is, subcarriers or physical resource blocks (PRBs)) on one or more carrier bands in the same time-domain resources (that is, in subframe units) from a cell or an eNB to a UE.

Similarly, the LTE-advanced system may support uplink transmission using frequency-domain resources (that is, subcarriers or physical resource blocks (PRBs)) on one or more carrier bands in the same time-domain resources (that is, in subframe units) from an arbitrary UE to a cell or an eNB. These are referred to as downlink carrier aggregation and uplink carrier aggregation, respectively. The configuration of a physical layer (PHY) and a layer 2 (layer 2 (MAC)) for transmission of a plurality of allocated uplink or downlink carrier bands from the viewpoint of an arbitrary cell or UE is shown in FIGS. 5 and 6.

Figure 5A:
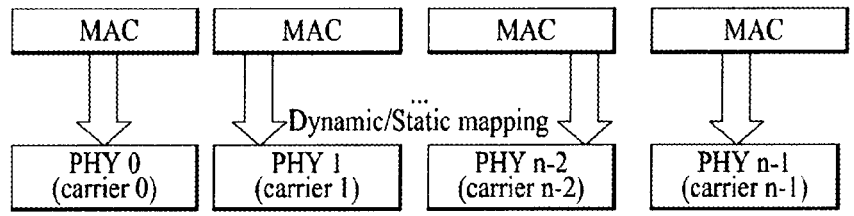
FIG. 5(a) is a diagram illustrating the concept that a plurality of medium access control (MAC) layers manages multiple carriers in an eNB.
Figure 5B:
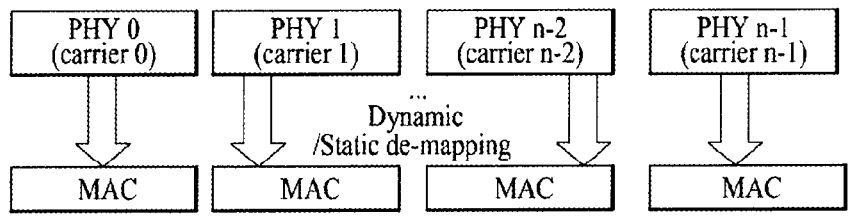
FIG. 5(b) is a diagram illustrating the concept that a plurality of MAC layers manages multiple carriers in a UE.

FIG. 5(a) illustrates the concept that a plurality of MAC layers manages multiple carriers in an eNB and FIG. 5(b) illustrates the concept that a plurality of MAC layers manages multiple carriers in a UE.

As shown in FIGS. 5(a) and 5(b), the MAC layers may control the carriers 1:1. In a system supporting multiple carriers, the carriers may be contiguously or non-contiguously used, regardless of uplink/downlink. A TDD system is configured to manage N carriers each including downlink and uplink transmission and an FDD system is configured to respectively use multiple carriers in uplink and downlink. The FDD system may support asymmetric carrier aggregation in which the numbers of aggregated carriers and/or the bandwidths of carriers in uplink and downlink are different.

Figure 6A:
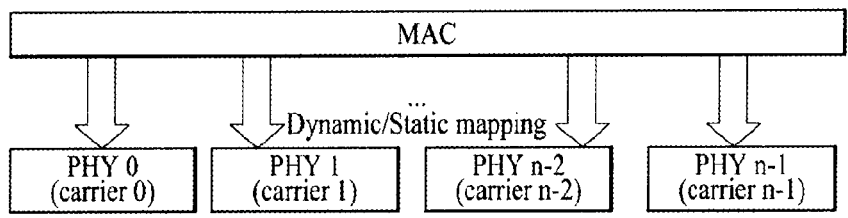
FIG. 6(a) is a diagram illustrating the concept that one MAC layer manages multiple carriers in an eNB.
Figure 6B:
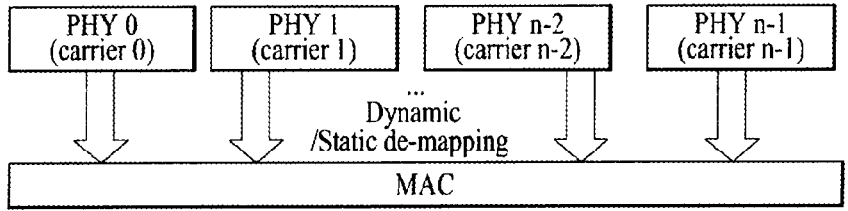
FIG. 6(b) is a diagram illustrating the concept that one MAC layer manages multiple carriers in a UE.

FIG. 6(a) illustrates the concept that one MAC layer manages multiple carriers in an eNB and FIG. 6(b) illustrates the concept that one MAC layer manages multiple carriers in a UE.

Referring to FIGS. 6(a) and 6(b), one MAC layer manages one or more frequency carriers so as to perform transmission and reception. Since frequency carriers managed by one MAC layer need not be contiguous, more flexible resource management is possible. In FIGS. 6(a) and 6(b), one PHY layer means one CC for convenience. Here, one PHY layer does not necessarily mean an independent radio frequency (RF) device. In general, one independent RF device means one PHY layer, but is not limited thereto. One RF device may include several PHY layers.

A series of physical downlink control channels (PDCCHs) for transmitting control information of L1/L2 control signaling generated from a packet scheduler of a MAC layer supporting the configurations of FIGS. 6(a) and 6(b) may be mapped to physical resources in a separate CC to be transmitted. At this time, in particular, PDCCHs of grant-related control information or channel assignment associated with transmission of a unique PDSCH or physical uplink shared channel (PUSCH) of a separate UE are divided according to CCs on which the physical shared channel is transmitted, are encoded and are generated as divided PDCCHs, which are referred to as separate coded PDCCHs. As another method, control information for transmitting the physical shared channels of several component carriers may be configured as one PDCCH to be transmitted, which are referred to as joint coded PDCCHs.

In order to support downlink or uplink carrier aggregation, an eNB may assign CCs to be measured and/or reported as a preparation process of establishing a link for transmitting a PDCCH and/or a PDSCH or if a link is established such that a PDCCH and/or a PDSCH for transmitting data and control information are transmitted according to situations on a per specific UE or relay node basis. This is expressed by CC assignment for an arbitrary purpose. At this time, an eNB may transmit CC assignment information via a series of UE-specific or RN-specific RRC signaling (UE-specific or RN-specific signaling) according to dynamic characteristics of control in the case in which the CC assignment information is controlled by L3 radio resource management (RRM) or transmit CC assignment information via a series of PDCCHs as L1/L2 control signaling or via a series of dedicated physical control channels for transmitting only control information.

As another method, in the case in which CC assignment information is controlled by a packet scheduler, the CC assignment information may be transmitted via a series of PDCCHs as L1/L2 control signaling or via a series of dedicated physical control channels for transmitting only control information or PDCCHs of an L2 MAC message format.

Hereinafter, a method of performing timing synchronization between carriers when one cell supports multiple carriers in a wireless communication system will be described. As an example of a wireless communication system, in particular, in an LTE-A system, setting of a subframe boundary between carriers upon operation of a UE and a cell supporting carrier aggregation is proposed. The present invention is described based on the LTE-A system, but is applicable to other wireless communication standards to which the same concept is applied.

Figure 7:
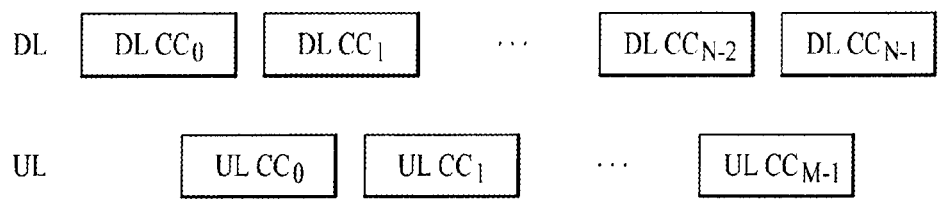
FIG. 7 is a diagram showing component carriers (CCs) configuring downlink and uplink connected to a UE or a relay node in an eNB or relay node area in an LTE-A system.

FIG. 7 is a diagram showing CCs configuring downlink and uplink connected to a UE or a relay node in an eNB or relay node area in an LTE-A system.

Referring to FIG. 7, downlink CCs and uplink CCs assigned by an arbitrary eNB or an arbitrary relay node are shown. For example, the number of downlink CCs is N and the number of uplink CCs is M. Here, the number of downlink CCs may be equal to or different from the number of uplink CCs.

In the LTE-A system, downlink CCs may be classified into three types. As a first type CC, there is a backward compatible CC supporting backward compatibility with an LTE rel-8 UE. As a second type CC, there is a non-backward compatible CC which cannot be accessed by LTE UEs, that is, which support only LTE-A UEs. In addition, as a third type CC, there is an extension CC.

The backward compatible CC which is the first type CC is a CC on which not only a PDCCH and a PDSCH but also a reference signal (RS), a primary-synchronization channel (P-SCH)/secondary-synchronization channel (S-SCH) and primary-broadcast channel (P-BCH) are transmitted according to an LTE structure in order to enable access of an LTE UE.

The non-backward compatible CC which is the second type CC is a CC on which a PDCCH, a PDSCH, an RS, a P-SCH/S-SCH and a P-BCH are transmitted in a modified format in order to disable access of an LTE UE.

The first type CC (that is, the backward compatible CC) enables an LTE UE and an LTE-A UE to access a cell (or eNB) and the second type CC (that is, the non-backward compatible CC) enables only an LTE-A UE to access a cell. The extension CC which is the third type CC disables a UE to access a cell and is referred to as a subsidiary CC of the first type CC or the second type CC. A P-SCH/S-SCH, a P-BCH and a PDCCH are not transmitted on the extension CC which is the third type CC and all resources of the third type CC may be used to transmit a PDSCH to a UE or may operate in a slip mode when the resources are not scheduled with respect to the PDSCH. An eNB or a relay node does not transmit control information to a UE via the third type CC.

That is, the first type CC and the second type CC may be of a stand-alone CC type necessary to establish one cell or capable of configuring one cell and the third type CC may be of a non-stand-alone CC type which coexists with one or more stand-alone CCs.

In an LTE-A system, if an arbitrary cell (or eNB) supports downlink via multiple downlink CCs, subframe synchronization between downlink CCs is generally performed. However, in the present invention, a timing offset may be set between the non-stand-alone CC such as the third type CC and the stand-alone CC such as the first type CC (backward compatible CC) or the second type CC (non-backward compatible CC), thereby reducing buffer overhead of a UE and saving power.

Figure 8:
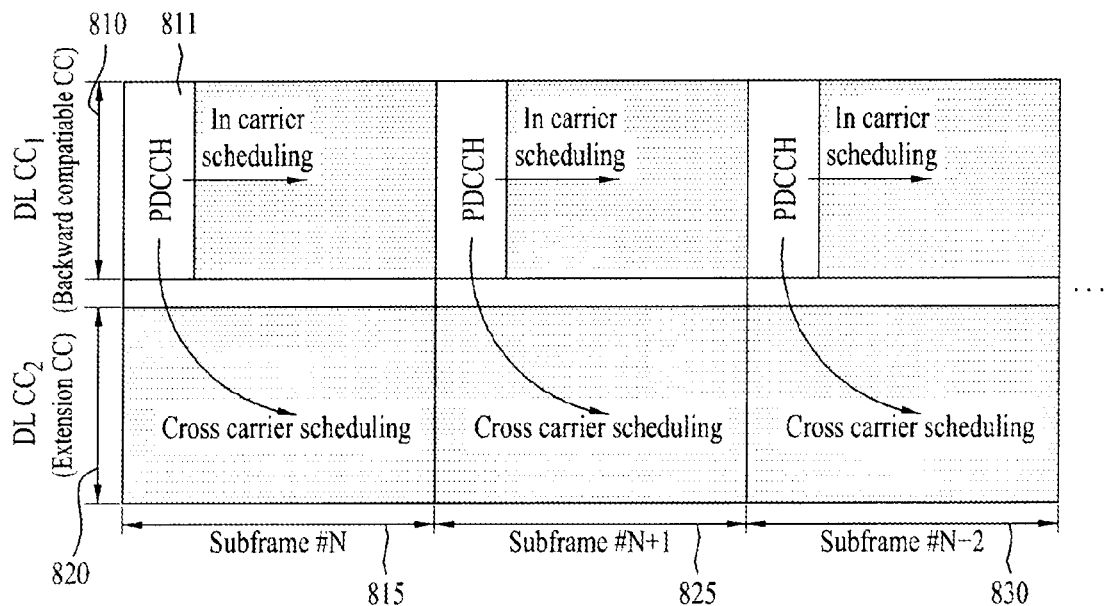
FIG. 8 is a diagram showing an example of the configuration of downlink CCs in the case where one cell (or one eNB) supports two downlink CCs.

FIG. 8 is a diagram showing an example of the configuration of downlink CCs in the case where one cell (or one eNB) supports two downlink CCs.

Referring to FIG. 8, a first downlink CC (DL CC1) 810 is a backward compatible CC, which corresponds to a first type CC. An eNB or a relay node may transmit a PDCCH 811 to a UE on a subframe 815 with an index N of the first downlink CC (DL CC1) 810. A second DL CC2 820 is an extension CC, which corresponds to the third type CC. The eNB or the relay node may transmit a PDSCH to the UE on a subframe 815 with an index N of the second downlink CC (DL CC2) 820. The eNB or the relay node may transmit scheduling information of the PDSCH on the subframe 815 with the index N of the second downlink CC (DL CC2) 820 to the UE via the PDCCH 811 of the first downlink CC (DL CC1) 810, as shown in FIG. 8. If multiple CCs are present, the eNB (or the relay node) transmits the PDCCH 811 on a first downlink CC (DL CC1) 810 but the PDCCH 811 is control information for a second downlink CC (DL CC2) 820. That is, the eNB may use the PDCCH 811 on the first downlink CC (DL CC1) 810 in order to schedule the PDSCH on the second downlink CC (DL CC2) 820. This is referred to as cross carrier scheduling. Such cross carrier scheduling may also be applied to uplink in the same manner.

Although the subframe 815 with the index N is described, this may be equally applied to a subframe 825 with an index N+1 and a subframe 830 with an index N+2.

Figure 9:
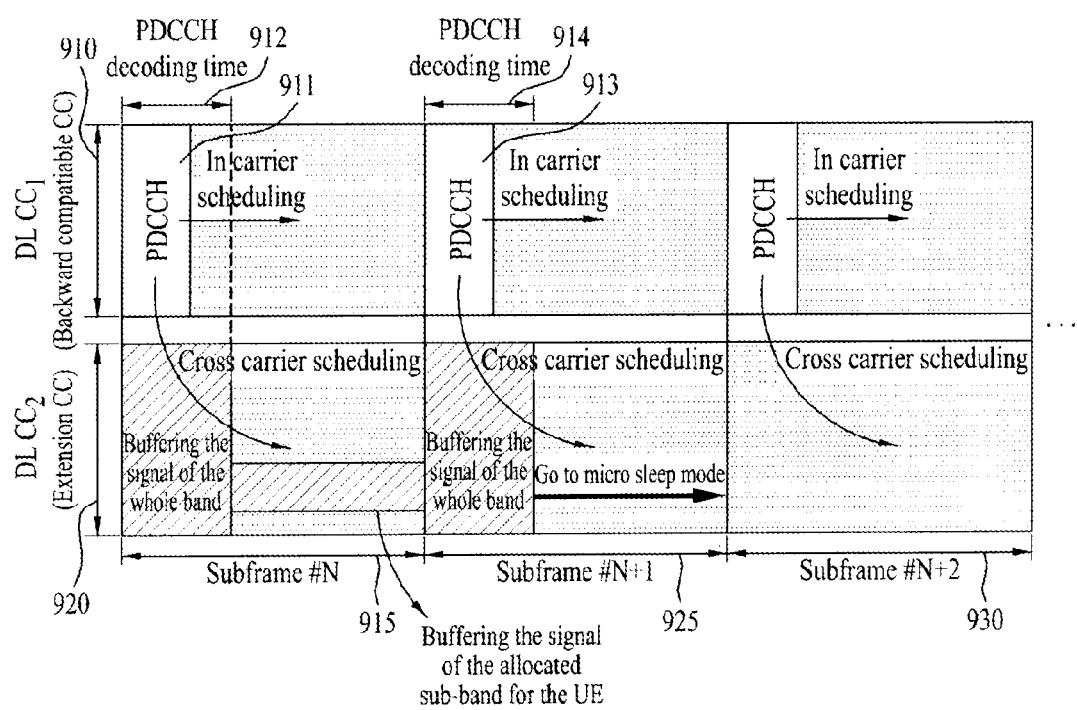
FIG. 9 is a diagram showing an example of an operation in a second downlink CC (DL CC2) according to a PDCCH decoding time of a UE in association with FIG. 8.

In FIG. 8, an LTE-A UE supporting carrier aggregation of a first downlink CC (DL CC1) 810 which is a backward compatible CC and a second downlink CC (DL CC2) 820 which is a third type CC operates according to a PDCCH decoding time of the first DL CC1 810 as shown in FIG. 9.

FIG. 9 is a diagram showing an example of an operation in a second downlink CC (DL CC2) according to a PDCCH decoding time of a UE in association with FIG. 8.

An operation of a UE on a second downlink CC (DL CC2) 920 will be described with reference to FIG. 9. The UE needs to receive a signal transmitted over the whole band of the second downlink CC (DL CC2) during a time corresponding to a time 912 necessary to decode a PDCCH 911 regardless of whether or not a PDSCH is transmitted. If an eNB or a relay node transmits a PDSCH on a subframe 915 with an index N of the second downlink CC (DL CC2) 920, a UE needs to receive a signal on all PRBs in addition to a PRB allocated thereto for PDSCH transmission. That is, the UE should receive (or buffer) a signal transmitted over the whole band of the second downlink CC (DL CC2) 920 during a time 912 necessary to decode the PDCCH 911. Accordingly, in this case, buffering overhead is caused in the UE.

If the eNB or the relay node transmits a PDSCH on a subframe 925 with an index N+1 of the second downlink CC (DL CC2) 920, the UE does not enter a micro sleep mode for power saving during a time 914 necessary to decode a PDCCH 913 and should receive a signal transmitted over the whole band of the second downlink CC (DL CC2) 920.

Although the subframe 915 with the index N and the subframe 925 with the index N+1 are described, the above description is equally applied to a subframe 930 with an index N+2.

In order to improve an inefficient operation of a UE, a method of setting a timing offset between a subframe boundary of a stand-alone CC (in FIG. 9, a backward compatible CC which is a first type CC) on which an eNB transmits a PDCCH and a subframe boundary of a non-stand-alone CC (in FIG. 9, an extension CC which is a third type CC) may be considered.

Figure 10:
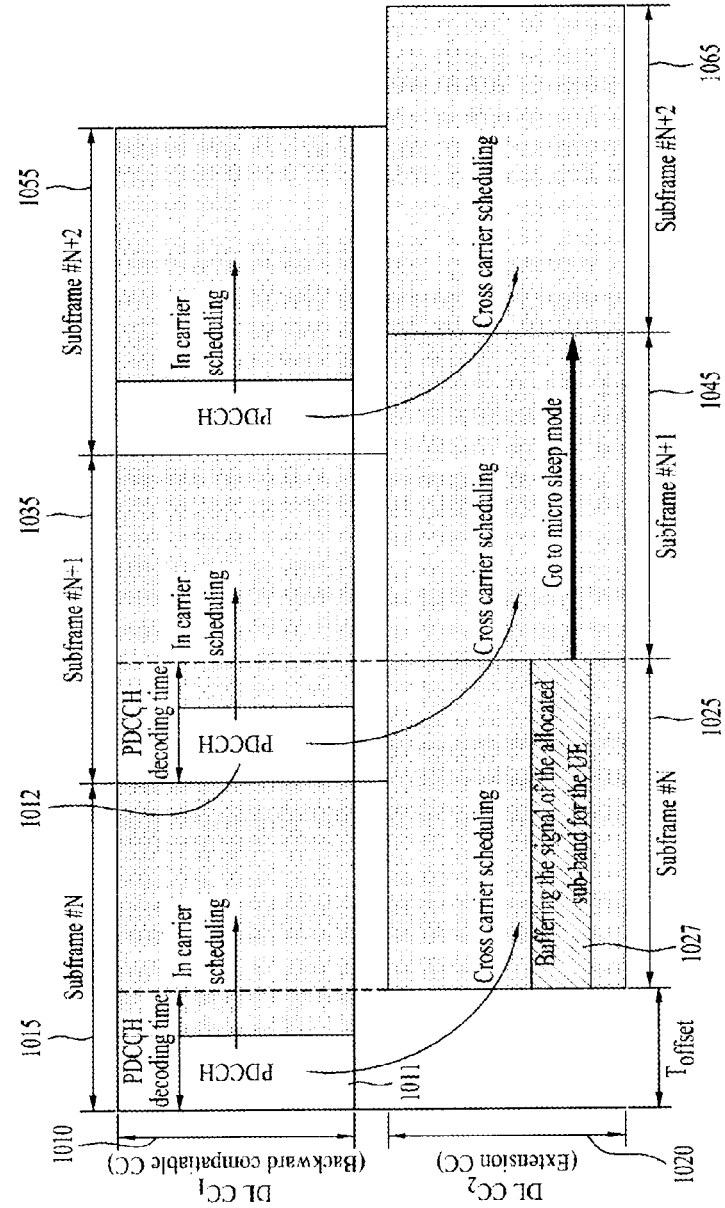
FIG. 10 is a diagram illustrating an operation of a UE in the case where a subframe boundary between a stand-alone CC and a non-stand-alone CC is shifted by a time offset value.

FIG. 10 is a diagram illustrating an operation of a UE in the case where a subframe boundary between a stand-alone CC and a non-stand-alone CC is shifted by a time offset value.

In FIG. 10, a backward compatible first type CC (DL CC1) 1010 among stand-alone CCs will be described. Accordingly, there is a specific time offset value $T_{offset}$ between a start point of a subframe 1015 with an index N of the first type CC (DL CC1) 1010 and a start time of a subframe 1025 with an index N of a second downlink CC (DL CC2) 1020. That is, the start time of the subframe 1025 with the index N of the second downlink CC (DL CC2) 1020 is shifted from the start point of the subframe 1015 with the index N of the first type CC (DL CC1) 1010 by the specific time offset value $T_{offset}$.

The UE may receive control information from the eNB or the relay node via a PDCCH 1011 on the subframe 1015 with the index N of the first type CC (DL CC1) 1010. If DL grant included in the PDCCH 1011 on the subframe 1015 with the index N of the first type CC (DL CC1) 1010 indicates that PDSCH transmission is scheduled on a subframe 1025 with the index N of the second downlink CC (DL CC2) 1020 in a cross carrier scheduling scheme (that is, if the eNB transmits a PDSCH on the subframe 1025 with the index N of the second downlink CC (DL CC2) 1020 which is the extension CC), the UE receives (or buffers) only a signal corresponding to an allocated sub-band 1027.

In contrast, if a PDCCH 1012 on a subframe 1035 with an index N+1 of the first type CC (DL CC1) 1010 indicates that PDSCH transmission is not scheduled on a subframe 1045 with an index N+1 of the second downlink CC (DL CC2) 1020, the UE may immediately operate in a micro sleep mode from a start time of the subframe 1045 with the index N+1. By such an operation, the UE can save significant power.

This is equally applicable to a subframe 1055 with an index N+2 of the first type CC (DL CC1) 1010 and a subframe 1065 with an index N+1 of the second downlink CC (DL CC2) 1020.

Next, setting of the time offset value $T_{offset}$ will be described in association with FIG. 10. The subframe offset value $T_{offset}$ between the CC, on which a PDCCH is transmitted, such as a stand-alone CC, and a CC on which only a PDCCH is transmitted, such as an extension CC which is a non-stand-alone CC, may be determined by PDCCH size. That is, if a time required to decode a PDCCH in the case where the PDCCH symbol is N symbols is $T_{decodeN}$, the value $T_{offset}$ may be dynamically changed according to a control format indicator (CFI) of every subframe, but may be set to $T_{offset} = T_{decodeN}$.

Alternatively, although a subframe boundary is shifted on a CC-by-CC basis (e.g., 1010 and 1020), since symbol boundaries need to match each other in order to maintain orthogonality between subcarriers. If one symbol duration is $T_{symbol}$, the value $T_{offset}$ may be expressed by Equation 1.

$$T_{offset} = T_{symbol} \times \text{ceil}\{T_{decodeN}/T_{symbol}\} \quad \text{Equation 1}$$

where, a ceil{k} function denotes a function for outputting a minimum value among integers greater than or equal to a specific number K.

As another method, a method of semi-statically or statically setting the value $T_{offset}$ without dynamically changing the value $T_{offset}$ of every subframe may be considered. In this case, the value $T_{offset}$ may be set to $T_{offset} = T_{decodeNmax}$ if a maximum PDCCH size which may be set at an eNB determined by a maximum CFI value is $N_{max}$. Even in this case, the value $T_{offset}$ offset may be expressed by Equation 2 in order to match the symbol boundaries between CCs.

$$T_{offset} = T_{symbol} \times \text{ceil}\{T_{decodeNmax}/T_{symbol}\} \quad \text{Equation 2}$$

where, a ceil{k} function denotes a function for outputting a minimum value among integers greater than or equal to a specific number K.

Alternatively, K arbitrary symbols may be shifted in symbol units, in units of one slot (0.5 ms) or in units of one subframe (1 ms).

The value $T_{offset}$ which may be variously set may be dynamically set by an eNB (or a relay node) via a PDCCH and may be transmitted to a UE. Alternatively, an eNB may semi-statically set a value $T_{offset}$ and inform a UE of the value $T_{offset}$ through cell-specific or UE-specific RRC signaling. The value $T_{offset}$ may be implicitly fixed and a UE may be aware of the value $T_{offset}$. An eNB may determine whether a subframe offset is applied according to a CC type, separately from the value $T_{offset}$. For example, an eNB may inform a UE that a subframe offset is applied to an extension subframe type and a subframe offset is not applied to other C types through cell-specific or UE-specific RRC signaling.

The description of FIGS. 9 and 11 may be equally applied to a normal CP and an extended CP regardless of a cyclic prefix (CP) size.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

A method of receiving a signal in a wireless communication system supporting multiple CCs and a UE for performing the same are industrially applicable to a wireless communication system such as a 3GPP LTE-A or an IEEE 802 system.

The invention claimed is:

1. A method of receiving signals by a user equipment (UE) in a wireless communication system supporting a plurality of component carriers, the method comprising:
   receiving, a radio resource control (RRC) signal including component carrier assignment information through a first type carrier, the component carrier assignment information including a second type carrier configured for the UE;
   receiving, an RRC signal including a value related to a physical downlink shared channel (PDSCH) starting orthogonal frequency division multiplexing (OFDM) symbol of the second type component carrier, through the first type carrier; and
   receiving a PDSCH of the second type component carrier through the second type carrier based on a physical downlink control channel (PDCCH) of the first type component carrier and the value related to the PDSCH starting OFDM symbol of the second type component carrier,
   wherein the value related to the PDSCH starting OFDM symbol of the second type component carrier is changeable according to RRC signaling.

2. The method of claim 1, wherein the first type carrier is not contiguous with the second type carrier.

3. The method of claim 1, wherein when the PDCCH further includes DCI indicating a PDSCH of the first second type component carrier is scheduled, further comprising:
   receiving the PDSCH of the first type component carrier and the PDSCH of the second type component carrier on same subframe.

4. The method of claim 1, wherein the second type component carrier is configured that a PDCCH for the UE is not transmitted.

5. The method of claim 1, wherein the PDSCH starting OFDM symbol of the second type component carrier is semi-statically configured.

6. The method of claim 5, wherein the PDSCH starting OFDM symbol of the second type component carrier is defined by a time offset value,
   wherein the time offset value is computed by Equation A:

$$T_{offset} = T_{symbol} \times \text{ceil}\{T_{decode\_Nmax}/T_{symbol}\} \quad \text{Equation A}$$

where, $T_{symbol}$ denotes a time corresponding to one symbol duration, $T_{decode\_Nmax}$ denotes a time required to decode the maximum symbols of the PDCCH, and a ceil function denotes a function for outputting a minimum value among integers greater than or equal to a specific number.

7. The method of claim 1, wherein the PDSCH starting OFDM symbol of the second type component carrier is applied to the secondary type carrier having a normal cyclic prefix (CP) or an extended CP, and
   wherein a PDSCH starting OFDM symbol of the second type component carrier having the extended CP is same as a PDSCH starting OFDM symbol of the second type component carrier having the normal CP.

8. A user equipment (UE) for receiving signals in a wireless communication system supporting a plurality of component carriers, the UE comprising:
   a receiver; and
   a processor;
   wherein the processor is configured to cause the receiver to:
      receive radio resource control (RRC) signaling including component carrier assignment information through a first type carrier, the component carrier assignment information including a second type carrier configured for the UE;
      receive RRC signaling including a value related to a physical downlink shared channel (PDSCH) starting orthogonal frequency division multiplexing (OFDM) symbol of the second type component carrier through the first type carrier; and
      receive a PDSCH of the second type component carrier on the second type carrier based on a physical downlink control channel (PDCCH) of the first type component carrier and the value related to the PDSCH starting OFDM symbol of the second type component carrier,
   wherein the value related to the PDSCH starting OFDM symbol of the second type component carrier is changeable according to RRC signaling.

9. The UE of claim 8, wherein the first type carrier is not contiguous with the second type carrier.

10. The UE of claim 8, wherein when the PDCCH further includes DCI indicating a PDSCH of the first second type component carrier is scheduled, wherein the processor is configured to cause the receiver to:
   receive the PDSCH of the first type component carrier and the PDSCH of the second type component carrier on same subframe.

11. The UE of claim 8, wherein the second type component carrier is configured that a PDCCH for the UE is not transmitted.

12. The UE of claim 8, wherein the PDSCH starting OFDM symbol of the second type component carrier is semi-statically configured.

13. The UE of claim 12, wherein the PDSCH starting OFDM symbol of the second type component carrier is defined by a time offset value, wherein the time offset value is computed by Equation A:

$$T_{offset} = T_{symbol} \times \text{ceil}\{T_{decode\_Nmax}/T_{symbol}\} \qquad \text{Equation A}$$

where, $T_{symbol}$ denotes a time corresponding to one symbol duration, $T_{decode\_Nmax}$ denotes a time required to decode the maximum symbols of the PDCCH, and a ceil function denotes a function for outputting a minimum value among integers greater than or equal to a specific number.

14. The UE of claim 8, wherein the PDSCH starting OFDM symbol of the second type component carrier is applied to the secondary type carrier having a normal cyclic prefix (CP) or an extended CP, and wherein a PDSCH starting OFDM symbol of the second type component carrier having the extended CP is same as a PDSCH starting OFDM symbol of the second type component carrier having the normal CP.

* * * * *